United States Patent [19]

Demke et al.

[11] 4,373,194
[45] Feb. 8, 1983

[54] FULL PAGE REPRESENTATION THROUGH DYNAMIC MODE SWITCHING

[75] Inventors: Kent R. Demke, Austin; Jerold D. Dwire, Round Rock, both of Tex.

[73] Assignee: International Business Machines Corporation, Armonk, N.Y.

[21] Appl. No.: 221,671

[22] Filed: Dec. 30, 1980

[51] Int. Cl.[3] .............................................. G06F 3/14
[52] U.S. Cl. .................... 364/900; 340/731; 364/521
[58] Field of Search ............... 364/200, 419, 521, 523, 364/900; 340/146.3 AH, 146.3 MA, 146.3 ED, 731, 812

[56] References Cited

U.S. PATENT DOCUMENTS

| | | | |
|---|---|---|---|
| 4,107,664 | 8/1978 | Marino | 340/731 |
| 4,168,489 | 9/1979 | Ervin | 340/146.3 AH |
| 4,197,590 | 4/1980 | Sukonick et al. | 364/900 |
| 4,254,416 | 3/1981 | Lelke | 340/731 X |
| 4,310,840 | 1/1982 | Williams et al. | 340/731 X |

OTHER PUBLICATIONS

IBM *Technical Disclosure Bulletin,* vol. 15, No. 7, Dec. 1972, p. 2146.
IBM *Technical Disclosure Bulletin,* vol. 19, No. 9, Feb. 1977, p. 3248.

*Primary Examiner*—Jerry Smith
*Attorney, Agent, or Firm*—A. P. Bryant

[57] ABSTRACT

There is described a technique for use in a word processing system for displaying a representation of the full page of text on less than an entire CRT screen where the full page representation is proportional to the hard copy output which eventually results. Dynamic mode switching is employed which enables the output on a given line of the display of both full size characters and miniature character representations. Dynamic mode switching also provides control of the placement of the miniature page representation on the CRT screen.

10 Claims, 8 Drawing Figures

FULL PAGE REPRESENTATION THROUGH DYNAMIC MODE SWITCHING

DESCRIPTION

Cross-References to Related Applications

U.S. patent application Ser. No. 219,668, filed Dec. 24, 1980 entitled "Interactive Combination Display", and having K. R. Demke and J. L. Mumola as inventors.

U.S. patent application Ser. No. 221,160, filed Dec. 30, 1980, entitled "Multiple Half-Line Spacing On a Miniature Page", and having K. R. Demke and J. D. Dwire as inventors.

U.S. patent application Ser. No. 227,109, filed Dec. 30, 1980 entitled "Proportionality in Miniature Displays", and having K. R. Demke as inventor.

U.S. patent application Ser. No. 219,666, filed Dec. 24, 1980, entitled "Displaying A Full Page Representation", and having K. R. Demke and J. L. Mumola as inventors.

U.S. patent application Ser. No. 219,683, filed Dec. 24, 1980, entitled "Displaying A Proportionally Outlined Miniature Page", and having K. R. Demke and J. L. Mumola as inventors.

BACKGROUND OF THE INVENTION

1. Field of the Invention

This invention relates to text editing with the aid of a CRT. More particularly it relates to a technique for reducing and displaying a representation of a full page of text on less than the entire screen. 2. Description of the Prior Art In word processing systems with a display for displaying text as it is entered and edited, an operator is usually unable to display an entire page because of the size of the screen. Often times, however, seeing the full page is desirable as it enables the operator to appreciate the proper spatial relationship of the text to the page boundaries.

One prior art technique for solving this problem is described in U.S. Pat. No. 4,168,489 wherein the actual text characters are compressed for the miniature format display. The height of each character is reduced by utilizing only certain of the rows of vertical dots. Horizontal reduction is accomplished by means of a circuit which decreases the current flowing through the horizontal winding of the cathode ray tube deflection yoke. The lessened current compresses the image width on the visual display screen. That patent also discusses other prior art techniques for reducing a page of text to fit within the confines of a partial page word processing system and points out why they are inappropriate. This reference teaches reduction of a page to about one-third its size so as to effectively fill the viewing area of the display. That is, a full page of text is displayed using characters reduced in both the horizontal and vertical dimensions of two-thirds. Not all of the compressed characters are legible. Normal word processing functions can be performed, however.

Another approach can be found in *IBM Technical Disclosure Bulletin* "Abbreviated Character Font Display", Volume 19, No. 9, February 1977, page 3248. That author discloses a technique for displaying significant shapes of characters, words and phrases to allow an operator the ability to quickly access a particular portion of the page without actually reading displayed text.

A different approach is illustrated in *IBM Technical Disclosure Bulletin* article "Combination of Alphanumeric and Formatting Data on the CRT Display", Volume 15, No. 7, December 1972, page 2136. A single dot is used to represent each normally 5×7 dot character. In this technique, the operator can see several lines of text in normal size as well as the total unit of text as represented by dots only. The active window area of the dot only portion of the display is intensified so that the operator can perceive the format relationship of the active text to the entire text. This active window may be moved at the operator's discretion. Interactivity is not disclosed in this article. Nor is there any attempt to make the displayed text representation proportional to hard copy page size, print pitch or orientation.

U.S. Pat. No. 4,107,664 relates to raster scanned display systems in which character size is enlarged in the horizontal dimension by increasing the number of times each dot is sequentially displayed.

OBJECTS OF THE INVENTION

An object of the present invention is to provide a means for displaying a representation of a full page of text on less than an entire CRT screen.

It is a further object to display a miniature full page representation which is dimensioned to provide proportionality to the actual page.

It is a further object of this invention to provide along with the miniature full page representation the capability to display normal size text on up to three sides of the miniature page.

It is a further object to provide software control of placement of the miniature page on the CRT screen.

SUMMARY

These and other objects are achieved with the present invention which utilizes attributes preceding character information to indicate to the system whether full size character data is to be displayed or miniature page representations. A technique with minimal impact on existing hardware allows several standard page sizes, for example, 8½×11, and 8½×14, to be represented on less than the entire CRT screen oriented with either their long or short sides parallel with the base of the display. To the standard attribute information stored with each displayable character location for conveying information to the hardware, such as turn on blink, bright, underscore, or the like, an extra attribute is defined for entering the miniature page mode which gives control where the miniature page is to be positioned on the screen.

BRIEF DESCRIPTION OF THE DRAWINGS

Other features and advantages of the present invention will become apparent from the following more particular description taken in connection with the accompanying drawings wherein.

DESCRIPTION OF THE PREFERRED EMBODIMENT

Figure 1:
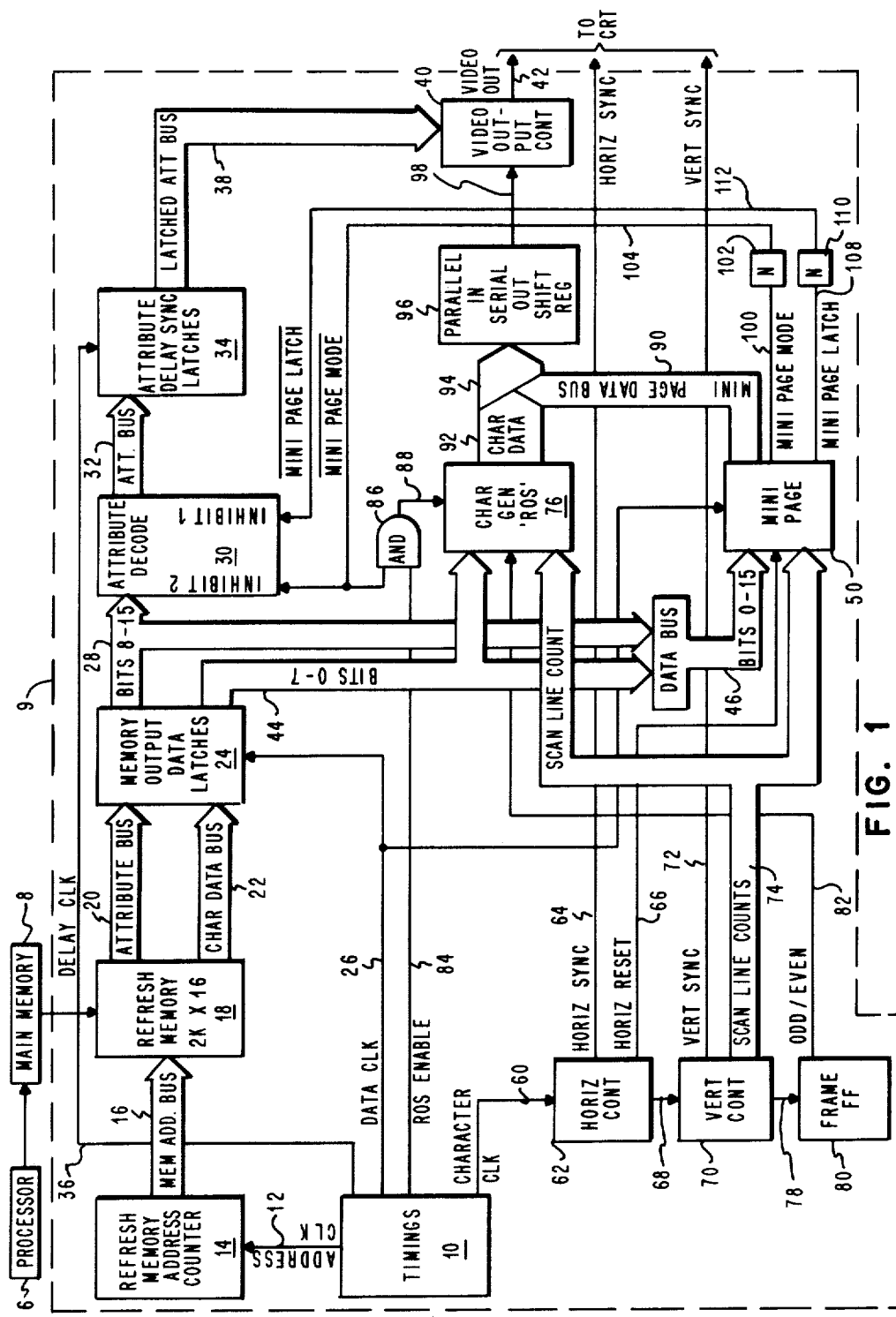
FIG. 1 is a block diagram of the system in which the present invention is implemented.

FIG. 1 is a block diagram of a typical implementation of a word processing system in which our invention is embodied. The illustrated system includes processor 6, memory 8, a display and a display interface logic 9. Only those connections between processor 6, main memory 8 and display interface logic 9 are shown as needed for purposes of explanation of our invention. Other interconnections therebetween are conventional and well understood by those skilled in the art.

Figure 8:
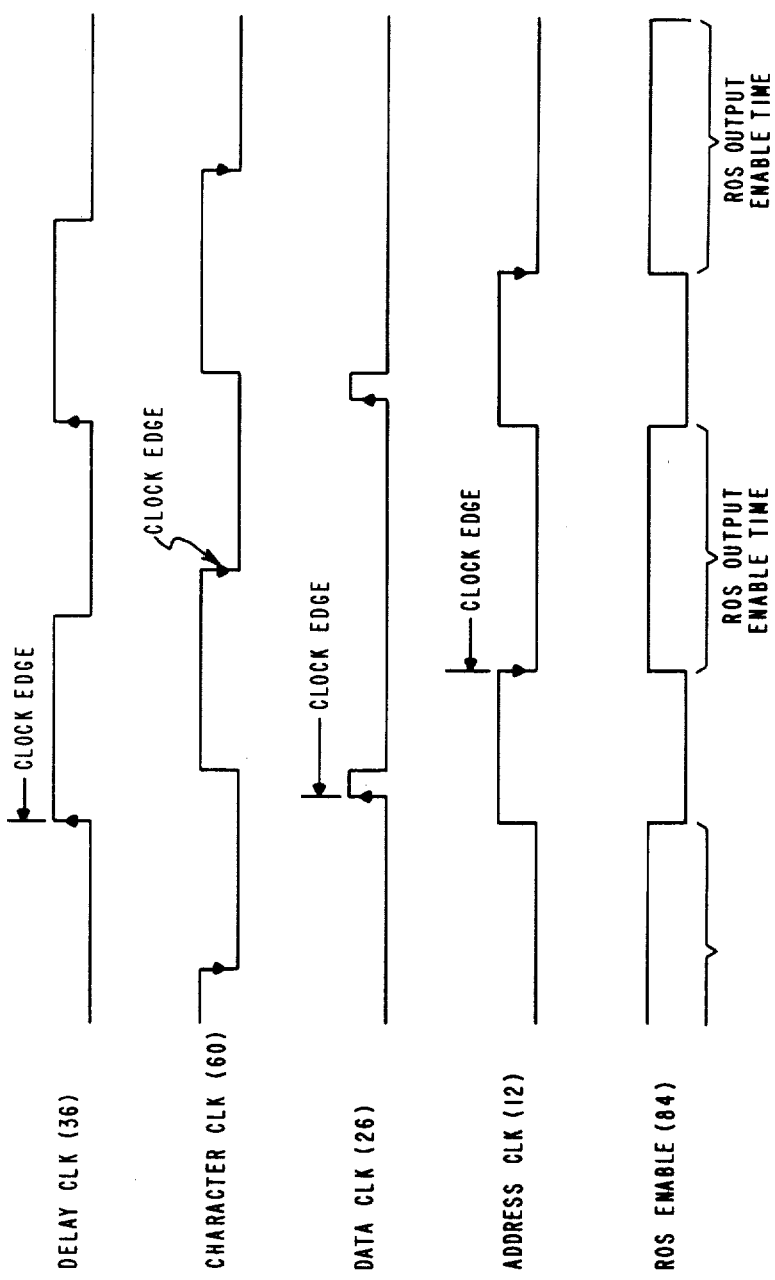
FIG. 8 is an illustration of timing relationship of the timing signals used in FIG. 1.

Timing generator block 10 provides various clocking signals for the word processing system illustrated. The wave forms of the signals output by timing generator 10 are illustrated in FIG. 8. The address clock signal on line 12 is input to refresh memory address counter 14 whose output appears on memory address bus 16. The address placed on bus 16 by processor 6 is input to the refresh memory 18. The data on both 20 and 22 are latched into memory output data latches 24. Another clock signal from timing generator block 10 is the data clock on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The latched attribute data is output on bus 38 to video output control 40, the output of which on line 42 is the video input to the CRT monitor (not shown).

The other eight bits of character data are output from memory output data latches 24 along bus 44. The total 16 bits of character information from latches 24 on the two buses 28 and 44 are joined in data bus 46 prior to being input to miniature page generator 50. Miniature page generator 50 also receives from timing generator 10 data clocking signals along line 26.

The character clock signal on line 60 is also output from timing generator 10. Character clock signals on line 60 are input to horizontal control 62 which generates horizontal synchronization signals on line 64 which is one input to the CRT monitor (not shown). Also generated in horizontal control 62 are horizontal reset signals on line 66. Horizontal reset signals on line 66 are input to miniature page generator 50 for reasons which will become clear as this description progresses. Vertical clock signals are generated in horizontal control 62 and are passed along line 68 to vertical control 70. Vertical control 70, in a conventional manner, generates vertical synchronization signals along line 72 for input to the CRT monitor. Vertical control 70 also generates counts of lines displayed on bus 74. Line count bus 74 is input to both miniature page generator 50, for purposes which will subsequently become clear, and to character generator storage 76. Vertical control 70 generates frame clock signals on line 78 which are input to frame flip-flop 80. Frame flip-flop 80 generates odd/even signals indicative of frame status in interlaced scanning terms and passes them along line 82 to character generator storage 76.

Character generator storage 76 also has an input from bus 44. Timing generator 10 generates the character generator storage enable signal along line 84 which is gated through AND gate 86. The signal arising in AND gate 86 passes along line 88 to character generator storage 76.

Miniature page generator 50 has three outputs. The first is the miniature page data bus 90 which is DOT-OR'D with the character data bus 92 from character generator 76. Either bus 90 or bus 92 data, as will become clear, is on bus 94 which is input to parallel to serial shift register 96. Serial data is output on line 98 to video output control 40. Another output from miniature page generator 50 is the miniature page mode signal on line 100 which is inverted by inverter 102. The inverted value on line 104 is an input to both attribute decode logic 30 as well as to AND gate 86. The final output of miniature page generator 50 is the miniature page latch signal on line 108 which is inverted by inverter 110. The inverted value of the miniature page latch signal on line 112 is the other input to the attribute decode 30.

Miniature page generator 50 is a key element of the system in which the present invention is implemented. Miniature page data to be displayed on the screen is written into refresh memory 18 using conventional write operations which form no part of the present invention. Once an operator has indicated to a system employing our invention a desire to display a miniature representation of a page, conventional techniques are used to read characters from the main or system memory (not shown) and to store "1"s for characters and "0"s for spaces in groups of 16 bits in display refresh memory 18.

Figure 2:
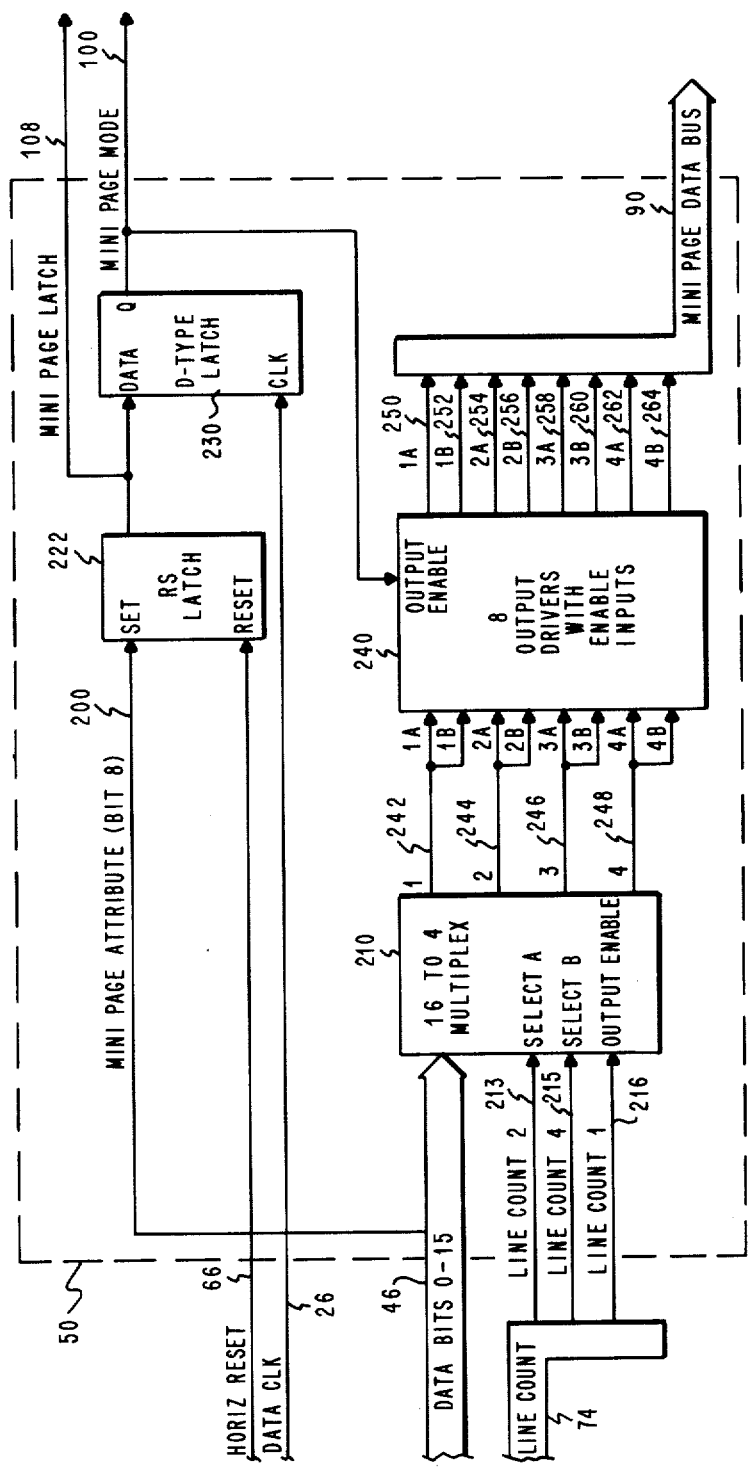
FIG. 2 is a more detailed diagram of miniature page generator block 50 of FIG. 1.

Referring now to FIG. 2, internal logic of miniature page generator 50 is shown in a greater level of detail. One of 16 data bits on bus 46, bit 8, is the miniature page attribute and is placed on line 200 to set RS latch 222. The reset input for RS latch 222 is provided by horizontal reset signal on line 66. The output of RS latch 222 is the miniature page latch signal on line 108 which, as will be recalled, is inverted and then used as an inhibit input to attribute decode logic 30 of FIG. 1. Line 108 is also the data input to D Type latch 230. The clock input to latch 230 is the data clock signal on line 26. The output of D latch 230 is the miniature page mode signal on line 100 which, after inversion, is applied as the other inhibit input to attribute decode 30 of FIG. 1.

Bus 46, carrying 16 bits of data is applied to 16 to 4 multiplexer 210. Multiplexer 210 is provided to divide the 16 data bits on bus 46 into four groups of four. Scan line counts 2 and 4 on lines 213 and 215, respectively, are taken from scan line count bus 74. Scan line 2 provides a Select A input and scan line count 4 the Select B input to multiplexer 210. The particular four bits taken from bus 46 are a function of the states of scan line counts 2 and 4. Scan line 1 on line 216 is the output enable signal for multiplexer 210.

Each group of four bits is broken down one bit each on lines 242, 244, 246, 248, respectively, on output multiplexer 210. Those lines, 242, 244, 246, and 248 are fanned out so that each one provides two inputs to a block of eight output drivers 240. When the miniature page mode indicator on line 100 is up, it enables output from the eight output drivers comprising block 240. The two bits derived from the one bit on lines 242 are output on lines 250 and 252. Similarly, the two bits from line 244 are output on 254 and 256, the two from line 246 on lines 258, 260, the two from line 248 on lines 262 and 264. These eight bits make one parallel word or byte of data on miniature page data bus 90 which provides an input to parallel to serial converter 96.

The serial output from shift register 96 is provided to video output control in the conventional manner for display on the CRT. Thus, the single bit stored in refresh memory 18 as a result of examining the data in the system main memory is changed to double dots in a 2×4 character box for output in the miniature page mode.

Figure 3:
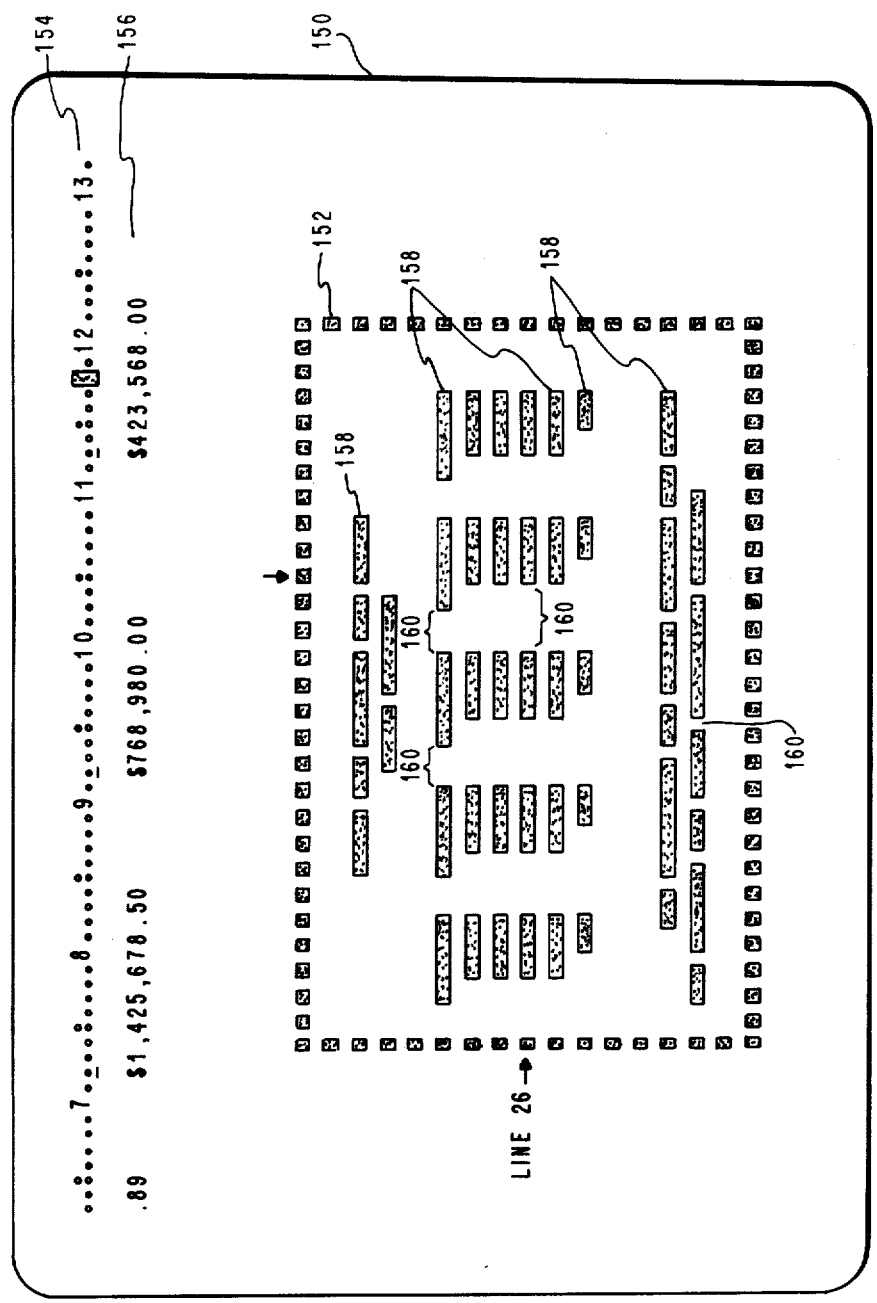
FIG. 3 is a representation of a CRT screen when the present invention is implemented.

FIG. 3 shows CRT screen 150. Indicated generally at 152 is a miniature full page representation for showing format and layout of the page being processed. Indicated generally at 154 is the scale line and at 156 the active cursor line, that is, the text being entered or modified. In a conventional manner cursor position within page representation 152 may be identified by blinking the particular miniature character representation corresponding thereto.

Figures 4, 5:
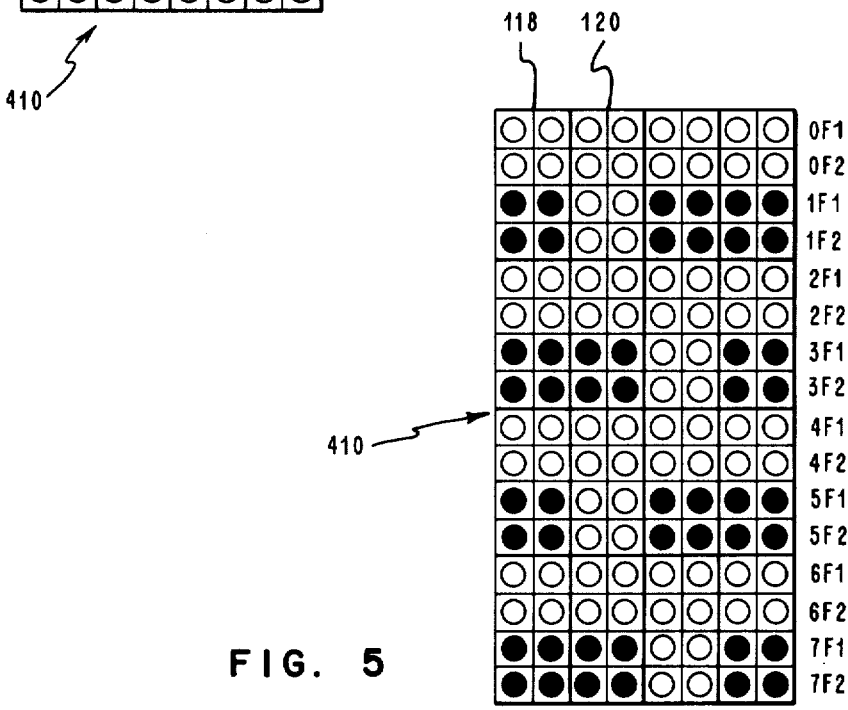
FIG. 4 is a schematic illustration of a full size character box.
FIG. 5 shows the relationship between character boxes as used in the miniature display and regular size character.

FIG. 4 is a schematic illustration of a normal size character box 410 as contemplated in the present invention. In our exemplary embodiment, this character box is 8×16, eight columns wide and 16 rows high. Rows are denoted R1 through R16; and columns, C1 through C8. A conventional CRT using interlaced scanning, as is well known in the art, can display dot matrix characters 8 dots by 16 dots high. Not all of these individual matrix positions are usually used for a given character. A regular character may, for example, be contained in rows 4 through 12 with the unused space being reserved for sub- and superscripts, and/or interline spacing. Columns 2 through 7 may be used for dots, and unused columns for inter-character spacing.

FIG. 5 shows how that same 8×16 matrix 410 can be divided into 16 2×4 miniature character representation boxes. In this manner we are able to display four characters for each of four consecutive lines in the space ordinarily occupied on a CRT screen by a single, normal size character. It is to be especially noted that our miniature display is not a display of characters, but of character representations which enable an operator to comprehend format and spatial relationships on the page being processed.

It is our character representation structure which permits miniature page display with minimal hardware impact. The use of interlaced scanning is advantageously combined with that structure. In interlaced scanning half of the alternating horizontal lines are scanned. These may be referred to as Field 1. The other half of the horizontal lines, alternating with Field 1 lines, are then scanned. These lines are referred to as Field 2. Scan Fields 1 and 2 are interlaced. In FIG. 5, the 16 rows are designated as $\phi$F1, 1F1, 2F1 ... 7F1, or $\phi$F2, 1F2, 2F2 ... 7F2, where F1 and F2 indicate scan Fields 1 and 2, respectively.

We use the convention that $\phi$ is an even number. It can be seen then that the even rows of both Fields 1 and 2 are blank, i.e., not dotted. In each of the 16 separate character representation boxes, these even rows are the topmost two rows. The bottom two rows in each box represent characters or spaces. Boxes like 118 are characters. Those like 120 are spaces. Returning briefly to FIG. 3, within miniature page representation 152 thick line segments 158 comprise a plurality of adjacent character representations 118 as shown in FIG. 5. Spaces 160 consist of space representations 120 in FIG. 5.

Figure 6:
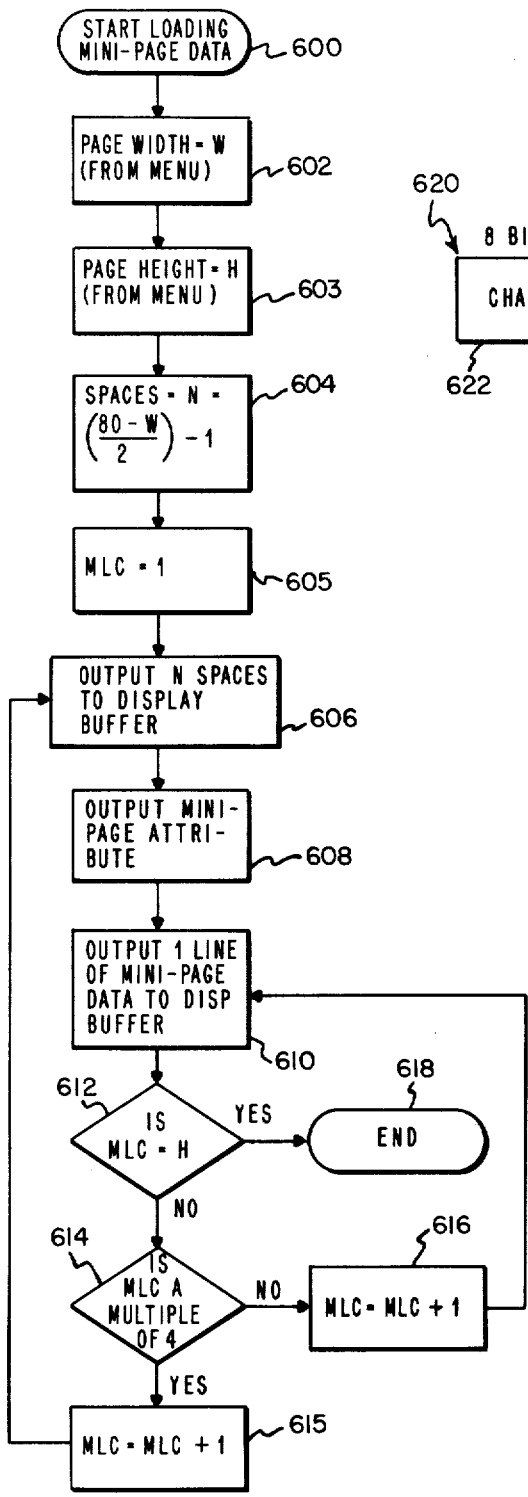
FIG. 6 is a flow chart useful in understanding the operation of the present invention.

FIG. 6 describes the actions taken by processor 6 of FIG. 2 for loading refresh memory 18 with the miniature page representation to be displayed. In a conventional manner an operator of a word processing system employing our invention is presented a menu through which to choose several options. The operator is given an opportunity to let the system know what size page and in which orientation it is to be placed. In FIG. 6, a block 600 is the entry point for displaying a miniature page representation. Process block 602 represents the software retrieval of the operator indicated page width "W". Likewise, block 603 represents the system retrieval of the operator designated page height "H".

Process block 604 is an illustrative calculation made to determine how many spaces N remain on the display screen to the left of the page size chosen. In the particular application being described the screen width is assumed to be 80 characters wide and 25 lines high. The miniature page is centered on the screen. Obviously, other calculations would be made to accommodate screens of different sizes, or to position the miniature page in a different place on the screen.

At block 605 the miniature page line count (MLC) is initialized to 1. Block 606 represents a software command to load the number of spaces calculated in block 604 into the refresh memory 18 in FIG. 2. It should be obvious to those skilled in the art at this point that the N spaces could be any combination of character symbols and text to the left of a miniature page display. This can be seen with reference to FIG. 3 where there is the legend LINE 26 to the left of miniature page outline 152.

Returning now to FIG. 6, it is at block 608 that what we refer to as dynamic mode switching occurs. This will become clearer in the description accompanying FIG. 7. At this point it is sufficient to say that the software loads an indicator to the hardware to switch into the miniature page mode as more fully described in copending application "Displaying A Full Page Representation" Ser. No. 219,666, filed Dec. 24, 1980. At process block 610 the miniature page representation character indicators for an entire line are loaded into refresh memory 18 of FIG. 1.

Integral with the output of lines of text representation is the outline 152 (FIG. 3) of the miniature page as more fully described in copending application "Displaying An Outlined Miniature Page" Ser. No. 219,683, filed Dec. 24, 1980. Decision block 612 represents the determination whether the number of lines output has reached the limit set by the operator indicated page height H. If not, a determination whether MLC is an integral multiple of 4 is made. If so, meaning that four miniature page lines corresponding spatially to one full size line have been loaded into refresh memory 18 of FIG. 1, MLC is incremented by one and control passes to block 606. If MLC is not an integral multiple of 4 then MLC is likewise incremented by 1 at block 616 but control returns to block 610 to load another miniature page line into refresh memory 18. When MLC reaches the user set limit, page height H, processing ceases at terminator block 618.

Figure 7:
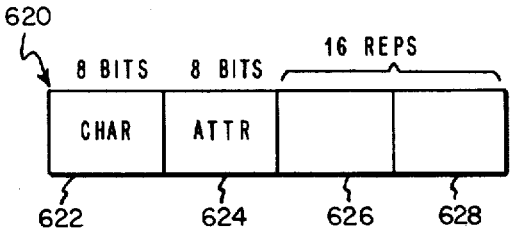
FIG. 7 is a schematic illustration of two entries in refresh memory 18 of FIG. 1.

The particular display buffer used for refresh memory 18 in FIG. 1 is organized on double byte boundaries, where each byte is eight bits long. Two bytes are used for each normal character. The rightmost 8 bits are used for attributes, including the miniature page attribute; the leftmost, actual character data. FIG. 7 shows a double word entry generally indicated at 620. The 8 bits used for attribute data are indicated in byte 624 and 8 bits of character information are in byte 622.

For a given line of miniature character indicators, however, the miniature page attribute data is issued to the system only once. A bit is reserved in the 8 bit byte used for attribute data, to indicate that a switch in mode from full size characters to miniature character indicators is to occur. It will be recalled from the discussion of FIG. 2 that it is this bit from line 200 which sets LATCH 222 for switching the hardware such that data bits from refresh memory 18 bypass character read only storage 76 and are transferred via bus 46 to the miniature page generator 50 and then via bus 90 to shift register 96.

Refer again to FIG. 7. As described earlier with reference to FIGS. 4 and 5, 16 miniature character representations may be indicated or stored in the space in refresh memory 18 normally occupied by the attribute and character information for a single full size character. This is indicated in 8 bit blocks 626 and 628.

Refer once again to FIG. 6 where block 610 indicates the output of miniature page attribute. This function may be better understood when related to FIG. 7. For instance, word 622, the attribute byte, contains, inter alia, the proper bit to signify to the system that a miniature page line is upcoming. While a character could immediately precede miniature page data, it may be desired to have a space preceding the miniature page. Thereafter, the next 16 bits are output from miniature page generator 50 (FIG. 1) as elsewhere described, as 16 2×4 character representations.

In this manner miniature page character indicators are output for the rest of that line. During horizontal reset all attributes are reset. Thus, for each line the process would be repeated of indicating to the system when it is desired to switch modes. Because the miniature page mode once indicated in the attribute is on for the rest of the line, no full size character data may be displayed to the right of the miniature page in the embodiment herein described.

In conclusion, we have described a technique for providing the user of a word processing system including a relatively small, 80 character wide, 25 lines high display screen the capability of displaying simultaneously with full size character data on three sides a miniature full page representation. That full page representation is proportional to the final hard copy output desired. The full size character data displayed to the left of the full page representation and character indicators which form the miniature full page representation are displayed using a combination of hardware and software to accomplish dynamic mode switching. This type of mode switching gives software control of where the miniature page is positioned on the CRT screen.

The preferred embodiment includes a method of latching the miniature page attribute and using its bit in the attribute word as communicative page data in the remainder of the line. It should be obvious to one skilled in the art however, that in an application where it is not necessary to use all available bits for miniature page data that a miniature page attribute could be assigned to all character positions including those with miniature page data. Thus, switching to and from miniature page mode may occur on the same scan. This allows regular size characters to be placed on any and all of the four sides of a miniature page representation.

It should also be obvious that dynamic mode switching as described herein could be used for generating bar graphs and the like using simulated miniature page data to display graphics along side regular size characters. As a further example, in a vertical scan application regular characters could be displayed above and to the right and left of the miniature page. Also, by selecting the proper scan lines, progressive scan applications can be made.

While the invention has been particularly shown and described with reference to preferred embodiments it will be, of course, understood by those skilled in the art that the above modification and various other changes in form and detail may be made without departing from the spirit and scope of the invention.

What is claimed is:

1. In a system including display screen means, memory means, printer means, and means for displaying a miniature representation of a full page of text being developed for output by said printer means, the method of dynamically switching from displaying full size data representations to miniature data comprising the steps of:
(1) determining the width in spaces and the height in lines, of the miniature page;
(2) calculating the number of available spaces remaining after the miniature page width is determined;
(3) loading the portion of memory means associated with said display means with full size character data for up to the number of spaces determined in the previous step, said full size character data being in the form of an attribute word and a character word;
(4) loading a predetermined attribute word, immediately after said full size character data, said predetermined attribute word being accessible by means for switching said display means into means for displaying a miniature page representation;
(5) loading in said memory means one more full size character word followed by miniature page data in all the memory locations for the remainder of the available spaces of said miniature page data being loaded in both attribute and character words.

2. The method of claim 1 wherein said width and height determining step comprises accessing locations in said memory means at which user inputs are stored; and said space determining step comprises subtracting from the display width in spaces the number of user designated miniature page width spaces.

3. The method of claim 2 in which the loading full size character data step includes beginning at the memory location associated with the leftmost part of the display means and proceeding left to right.

4. The method of claim 3 in which said attribute word is used to communicate page data for the remainder of each of the lines adjacent said miniature page.

5. The method of claim 4 wherein a miniature page attribute is assigned to each character in each of said adjacent lines.

6. The method of claim 1 in which the loading full size character data step includes beginning at the memory location associated with the leftmost part of the display means and proceeding left to right.

7. The method of claim 6 in which said attribute word is used to communicate page data for the remainder of each of the lines adjacent said miniature page.

8. In a system including display screen means, memory means, printer means, and means for displaying a miniature representation of a full page of text being developed for output by said printer means, and means for dynamically switching from displaying full size data representations to miniature data, said switching means comprising:

means for determining the width in spaces and the height in lines, of said miniature page, means for determining how many spaces of those available remain after said miniature page width is determined, means for loading the portion of memory means associated with said display means with full size character data for up to the number of spaces determined, said full size character data being in the form of an attribute word and a character word;

means for loading a predetermined attribute word, immediately after said full size character data, said predetermined attribute word being accessible to said means for switching said display means into means for displaying a miniature page representation; and means for loading in said memory means one more full size character word followed by miniature page data in all the memory locations for the remainder of the available spaces of said miniature page data being loaded in both attribute and character words.

9. The system of claim 8 further wherein said width and height determining means comprises means for accessing locations in said memory means which store user inputs; and said space determining means comprises means for subtracting from the display width in spaces the number of user designated miniature page width spaces.

10. The system of claim 9 in which the loading full size character data means includes means for beginning at the memory location associated with the leftmost part of said display means and proceeding left to right.

* * * * *